United States Patent

[11] 3,544,114

[72] Inventor Frank G. Malone
Palatine, Illinois
[21] Appl. No. 633,548
[22] Filed April 25, 1967
[45] Patented Dec. 1, 1970
[73] Assignee Motorola, Inc.
Franklin Park, Illinois
a corporation of Illinois

[54] TRACK INDICATOR FOR MULTI-TRACK TAPE PLAYER
4 Claims, 4 Drawing Figs.

[52] U.S. Cl. .......... 274/4, 116/129; 179/100.2
[51] Int. Cl. .......... G11b 5/00
[50] Field of Search .......... 33/172(A); 274/4, 11; 179/100.2(Mi), (CA); 74/99, 471(Inquired); 116/129(Inquired); 226/70

[56] References Cited
UNITED STATES PATENTS

| | | | |
|---|---|---|---|
| 3,337,105 | 8/1967 | Wilson | 226/90 |
| 3,095,750 | 7/1963 | Mahn | 74/99 |
| 2,908,769 | 10/1959 | Fonda | 179/100.2 |
| 2,224,728 | 12/1940 | Gulliksen | 33/172 |
| 691,968 | 1/1902 | Paine | 74/471 |

*Primary Examiner*—Leonard Forman
*Assistant Examiner*—Dennis A. Dearing
*Attorney*—Mueller, Aichele & Rauner

ABSTRACT: This apparatus utilizes a member pivoted to the tape player which has an angular slot in it for converting the vertical movement of the player head assembly between the different tracks of the multitrack tape into motion for operating a track indicator device. A pickup arm is connected to the head assembly and rides in the angular slot in the member. The arm slides in the angular slot when the head is positioned to a different track causing the member to pivot thereby rotating a pointer indicator arm to a number corresponding to the track to which the head assembly is positioned.

FIG. 1
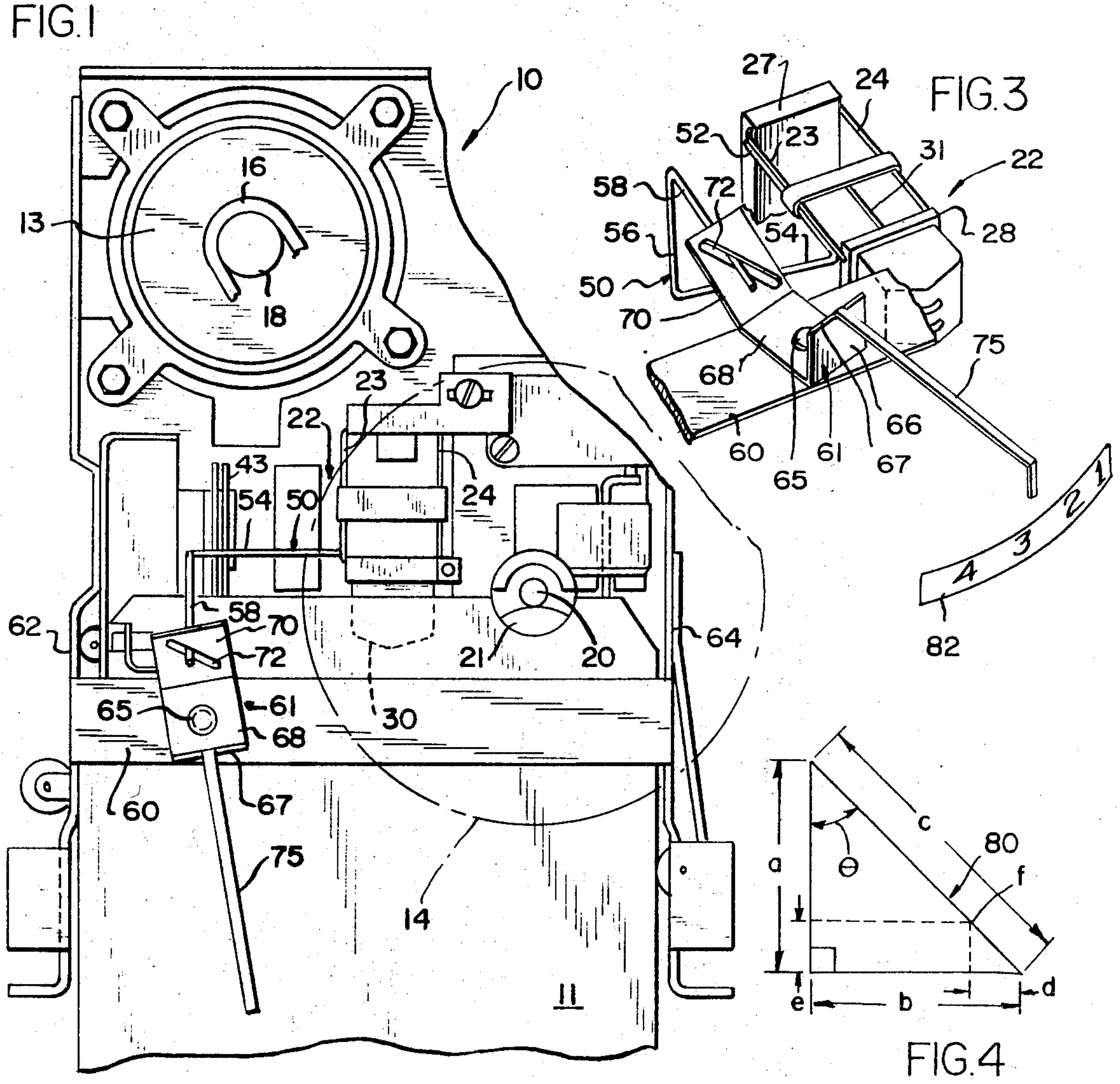
FIG. 1, FIG. 3, FIG. 4
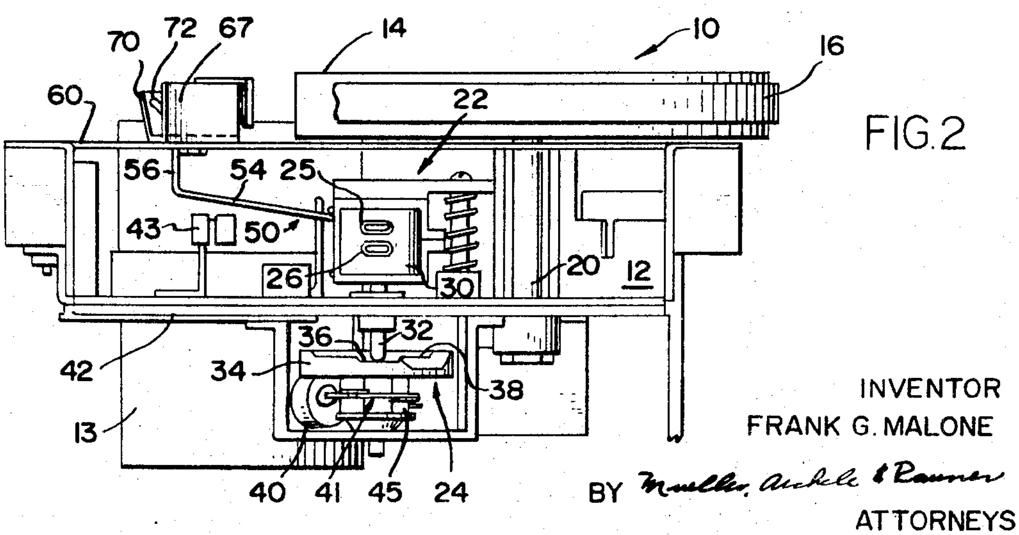
FIG. 2
INVENTOR
FRANK G. MALONE
BY Mueller, Aichele & Rauner
ATTORNEYS

TRACK INDICATOR FOR MULTI-TRACK TAPE PLAYER

CROSS-REFERENCE TO RELATED APPLICATIONS

Reference is made to U.S. Pat. applications Ser. No. 520,169, filed Jan. 12, 1966 and Ser. No. 567,126, filed July 22, 1966 now abandoned, which are assigned to the assignee of this application, and which describe multitrack tape players.

BACKGROUND OF THE INVENTION

This application pertains generally to a device for converting linear, vertical motion into rotational, horizontal motion, and more particularly to a device for translating the motion of a tape head between the different tracks of a multitrack tape, into motion for positioning an indicator to show the track to which the head is positioned.

In the past, most multitrack tape players have failed to provide means for indicating to which track the tape head is positioned. In some tape players, complicated mechanical apparatus which operates off the head assembly positioning mechanism has been used. This apparatus, however, generally requires additional power from the device driving the head positioning mechanism making it necessary to enlarge the work output of the device to accommodate the added load thereby increasing space requirements and adding to production costs.

SUMMARY

It is an object of this invention to provide a simple and relatively inexpensive device for converting linear, vertical motion into rotational, horizontal motion.

It is another object of this invention to provide an improved, relatively simple mechanical apparatus for translating the motion of a tape head in a multitrack tape player, between the different tracks of the tape, into motion for positioning a device to indicate the track to which the tape head is positioned, which apparatus is compact and relatively inexpensive to produce.

In one embodiment of this invention, apparatus is provided for translating linear, vertical motion of a first member into rotational, horizontal motion of a second member, which motion varies directly with respect to the vertical motion of the first member. The apparatus includes a pickup arm that is coupled to the first member and slidably engaged in an angular slot in a transfer lever that is pivotally mounted to a horizontal surface. The arm moves linearly and vertically with the first device and has a portion that slides in the angular slot to cause the transfer lever to rotate about its pivot. A second member is coupled to the transfer member and is rotated by it in a horizontal plane in response to the movement of the first member.

This apparatus can be adopted, but it is not limited, to use in a cartridge-type tape player adapted to play cartridges containing multitrack tape, for indicating the track to which the magnetic tape head assembly is positioned The tape player utilizes a cam follower coupled to the magnetic tape head assembly for positioning the assembly to play the different tracks on the tape. The cam follower is positioned to engage a cam device that has a plurality of different cam surfaces, each surface being associated with a different track on the tape. A solenoid is coupled to the cam device and is responsive to the completion of the playing of a track on the tape to rotate the cam to position a different cam surface into contact with the cam follower. A pickup arm is coupled to the magnetic tape head assembly and rides in an angular slot in a transfer member that is pivotally mounted to the tape player deck. The vertical movement of the head assembly between the tracks on the tape moves the pickup arm with it in the angular slot. The movement of the arm in the slot causes the transfer member to rotate about its pivot to position a pointer indicator arm, coupled to the transfer member, to one of a plurality of equally spaced numbers on an indicator dial, each one of which corresponds to a different track on the tape, to indicate the track to which the head assembly is positioned.

In the drawing:

FIG. 1 is a top plan view illustrating a multitrack tape player and showing the indicating device in accordance with this invention;

FIG. 2 is a front elevation view of the tape player of FIG. 1;

FIG. 3 is a perspective view illustrating the indicating device in accordance with this invention; and FIG. 4 is a schematic representation illustrating the motion of the device shown in FIG. 3.

DETAILED DESCRIPTION

Referring to the figures of the drawing, FIGS. 1 and 2 illustrate a stereophonic, cartridge-type tape player 10 that is adapted to receive and play cartridges 11, having multitrack tape therein, in the chamber 12. A motor 13 drives the flywheel 14 through a belt 16 driven by pulley 18. Flywheel 14 drives the capstan shaft 20 in the known manner to move the tape between the shaft 20 and pinch roller 21 in the cartridge past the sound head assembly 22. The tape used in this example has four stereo pairs of recorded tracks thereon or eight recorded tracks altogether. The head assembly 22 is positioned by a pancake cam device 24 so that the two playback portions 25 and 26 on the tape head 30 are alined with two tracks on the tape which form a stereo pair. The head assembly 22 (FIG. 3) includes a pantograph having two parallel arms 23 and 24, which are pivotally mounted to the fixed block 27 and to the head retainer 28, and a third arm 31. The pantograph assembly insures the parallel positioning of the tape head 30 to the tape, with the head assembly 22 being moved in a vertical plane. A detailed description of such a pantograph for tape head mounting can be found in application Ser. No. 567,126, filed July 22, 1966 and assigned to the assignee of this application.

The head assembly 22 is positioned between the different tracks on the tape by the cam device 24 which is coupled through cam follower 32 to the head assembly 22. The cam device 24 includes cam 34 which has a plurality of different cam surfaces such as 36 and 38, and each different cam surface is associated with a different pair of tracks on the tape. A solenoid 40 is mounted to the bottom deck 42 of the tape player 10 and is energized to rotate the cam device 24 to position the head assembly 22 to the different tracks on the tape. The solenoid is coupled to a toothed gear 45, which is connected to the cam 34 by pawl mechanism 41. The pawl mechanism 41 rotates the toothed gear 45 to move cam 34 through one-half of the desired movement, when the solenoid armature is drawn into the solenoid upon actuation thereof. When the solenoid 40 is deenergized, the solenoid armature returns to the extended position rotating the toothed gear 45 the remaining amount to complete a cycle of movement for cam 34 to position a different cam surface in contact with the cam follower 32.

At the end of each track on the tape there is a contact strip which is a good electrical conductor. When this material bridges the contacts 43, the contacts are closed to couple a potential to the solenoid 40. When the conducting strip passes the contacts 43, the circuit is broken and the armature of solenoid 40 is returned to its extended position to complete a cycle of rotation of the cam 34 thereby positioning the head mechanism 22 to the next pair of tracks.

Because the tape player 10 plays stereo tapes having four different pairs of tracks, it is desirable for the tape player operator to know to which pair of tracks the head assembly 22 is positioned. FIG. 3 illustrates a simple mechanical device which provides indication of the tracks to which the head is positioned. The track indicator includes a pickup arm 50 that a has a first portion 52 which is connected to and runs parallel with arm 23 of the pantograph. A second portion 54 of the pickup arm 50 is formed so as to be bent normal to the portion 52 and, as shown in FIG. 2, at an angle inclined from the horizontal to permit it to clear various parts of the tapeplayer apparatus such as contacts 43. A third portion 56 of the pickup arm 50 is bent such that it extends substantially normal to the portion 54 and in a vertical plane parallel to the plane in which the head assembly 22 moves when being positioned between the different tracks on the tape. The portion 56 is long enough to extend the pickup arm mechanism from inside the tape player 10 to a point above the metal strip 60 which joins the sidewalls 62 and 64 of the player 10. A fourth portion 58 of the pickup arm 50 is parallel to the portion 52 and bent at an angle with the horizontal plane so that it extends upwardly and outwardly from the inside of the player 10 to insure that the arm mechanism clears the cartridge 11 when it is inserted into the player.

Mounted to the plate 60 is a transfer lever 61 that includes a formed metal piece 66 which is pivotally mounted to the strip 60 by rivet 65. The formed strip 66 includes a first portion 67 that is bent normal to the horizontal strip 60, a second portion 68 that lies flat on the plane of the strip 60 and a third portion 70 that is bent so that it forms an obtuse angle with the plane of 60. The portion 70 of the transfer lever 61 has an angular slot or bearing surface 72 that has a slope of 45°. The portion 58 of pickup arm 50 extends through the angular slot 72 and engages the upper or lower edges of the slot depending on whether the arm 50 is moved up or down. A pointer indicator arm 75 extends normal to the portion 67 of transfer lever 61 and lies generally in a horizontal plane and on the center line drawn through the rivet 65 that forms the pivot for the lever.

By referring to FIG. 4, the operation of the transfer lever 61 can be more readily understood. Side *a* of the right triangle 80 is a graphic representation of the vertical plane in which the head assembly 22 is moved by the cam device 34. Side *b* is a graphic representation of the horizontal plane normal to the vertical plane a through which the pointer indicator arm 75 moves. Slide *c* of the triangle represents the slope of the slot 72 which is chosen so that angle theta equals 45°. By choosing this slope, motion of the head assembly 22 in the vertical plane represented by line a for an amount shown at *e* will cause the pickup arm 50 to slide along the 45° slope of the slot 72 represented by side *c* to a point *f*, and the transfer lever 61 will be pivoted about the rivet 65 to move the indicator arm 75 an amount shown at *d* which is directly proportional and equal to the amount that the head mechanism 22 moves as shown at *e*. Therefore, the transfer lever 61 effectively translates the linear, vertical movement of the head assembly 22 into rotational, horizontal movement of the pointer indicator arm 75. This horizontal movement provides a direct linear readout of the vertical head motion.

Operation of the track indicator device for the cartridge tape player 10 is as follows. At the end of the playing of a pair of tracks on the tape, the conducting strip will bridge the contacts 43 causing the solenoid 40 to be energized to actuate the pawl device 41 to cycle the cam 34 to position a new cam surface 38, for instance, into contact with the cam follower 32. The cam 32 then raises the head assembly 22 to position the magnetic tape head 30 in position for playing the next pair of tracks on the tape. Movement of the head assembly 22 causes the portion 52 of pickup arm 50 to move upward in a vertical plane parallel to the head assembly 22. This vertical movement of the pickup arm 50 causes portion 58 of the pickup arm to move an equal amount parallel to portion 52 and to slide in the angular slot 72 of the transfer lever 61. Sliding of the portion 58 of the arm 50 in the angular slot 72 causes the portion 68 of the lever to pivot about rivet 65. This causes rotational movement of the indicator pointer arm 75 clockwise about the rivet 65, as viewed in FIG. 2, to move the indicator pointer arm 75 from track 2 to track 3, as shown on the dial 82.

The dial 82 can be located anywhere on the front of the tape player at a point where it could be easily readable by the operator of the player. The excursion of the arm in the slot 72 between different tracks as the head assembly 22 moves between different tracks is sufficient to permit relatively wide spacing between the numbers of the dial 80 to provide an easy readout. It should also be noted that, as was explained in conjunction with FIG. 4, the readout of the indicator pointer 75 is linear and directly proportional to the vertical motion of the tape head assembly 22 to permit equidistant spacing of the numbers on the dial 82.

It can be seen that because no springs are used in the transfer device lever 62 and because it is free to rotate about rivet 65, very little force is required to move the arm 50 in the angular slot 72 to provide the indicator function of the device. For this reason, one does not have to be concerned with the problem of whether the power of solenoid 40 is sufficient to rotate the cam 34 to position the tape head assembly 22 to the next pair of tracks and at the same time operate a device for indicating the track to which the head assembly 22 is positioned.

What has been described, therefore, is an improved mechanical device for translating the motion of a tape head, in a multitrack tape player, between the different tracks of the tape into motion for positioning an indicator to indicate the track to which the tape head is positioned.

I claim:

1. Apparatus for indicating the track to which a head assembly is positioned on a multitrack tape for use in an electronic device adapted to receive and play a container holding the multitrack tape, and having means for linearly moving the head assembly between the different tracks on the tape, the apparatus including in combination, an arm connected to the head assembly and operable thereby to move linearly with the same, indicator means for indicating the track to which the head assembly is positioned, and transfer means pivotally mounted to the apparatus and including an angular bearing surface, said arm engaging said bearing surface so that the positioning of the head assembly to a different track on the multitrack tape moves said arm along said angular bearing surface surface to pivot said transfer means thereby rotating said indicator means to indicate to which track the head assembly is positioned.

2. The apparatus of claim 1 wherein said angular bearing surface is an angular slot having a slope of 45°, said arm moving in said slot and along said slope with the movement of the head assembly to pivot said transfer means to rotate said indicator means, said 45° angle of said slot making the rotation of said indicator means directly proportional to the movement of said head assembly between the tracks on the tape.

3. The apparatus of claim 2 wherein said indicator means includes a pointer indicator and an indicator dial having equally spaced numbers thereon, each number corresponding to a different track on the tape, said pointer indicator arm being coupled to said transfer means and being movable thereby between the numbers on said dial with the head assembly being positioned between the different tracks on the tape to indicate the track to which the head assembly is positioned, with said 45° angle of said slot of said transfer means providing a linear readout of the motion of the head assembly on said dial.

4. Apparatus for indicating the track to which a head assembly is positioned on a multitrack tape for use in an electronic device adapted to receive and play a container holding the multitrack tape, and having means for linearly moving the head assembly between the different tracks on the tape, the apparatus including in combination, sensing means including an arm coupled to the head assembly and operable thereby to move linearly with the head, transfer means including a rotatably mounted linkage having a shaped cam surface, said arm of said sensing means movably engaging said cam surface, indicator means for indicating the track to which the head assembly is positioned, said indicator means being connected to said rotatable linkage of said transfer means, and said linkage being rotated by the movement of said arm along said cam surface with the head assembly being positioned to a different track on the multitrack tape to translate the linear motion of the head assembly into rotational movement thereby moving said indicator means to indicate the track to which the head assembly is positioned.